(12) United States Patent
Jen et al.

(10) Patent No.: US 7,346,259 B1
(45) Date of Patent: Mar. 18, 2008

(54) THERMALLY REVERSIBLY CROSSLINKABLE POLYMER AS CLADDING MATERIAL FOR ELECTRO-OPTIC DEVICES

(75) Inventors: Kwan-Yue Jen, Kenmore, WA (US); Jingdong Luo, Seattle, WA (US); Sen Liu, Seattle, WA (US)

(73) Assignee: University of Washington, Seattle, WA (US)

( * ) Notice: Subject to any disclaimer, the term of this patent is extended or adjusted under 35 U.S.C. 154(b) by 116 days.

(21) Appl. No.: 11/208,044

(22) Filed: Aug. 18, 2005

Related U.S. Application Data (60) Provisional application No. 60/602,699, filed on Aug. 18, 2004.

(51) Int. Cl.
*G02B 6/10* (2006.01)

(52) U.S. Cl. .................. 385/145; 385/141; 385/129

(58) Field of Classification Search ............ None
See application file for complete search history.

(56) References Cited

U.S. PATENT DOCUMENTS

| | | | | |
|---|---|---|---|---|
| 3,435,003 | A | * | 3/1969 | Craven ................ 525/445 |
| 5,046,800 | A | * | 9/1991 | Blyler et al. ............ 385/131 |
| 5,776,374 | A | | 7/1998 | Newsham et al. |
| 5,990,267 | A | | 11/1999 | McNutt |
| 2002/0064896 | A1 | * | 5/2002 | Zhao et al. ............. 438/31 |
| 2004/0028369 | A1 | * | 2/2004 | Aylward et al. ......... 385/145 |
| 2004/0266954 | A1 | * | 12/2004 | Jen et al. ............... 525/326.1 |

OTHER PUBLICATIONS

W.R.C. Coode-Adams. The refractive index of quartz. Proceedings of the Royal Society of London (Series A), vol. 117, No. 776, pp. 209-213, Dec. 1927.*

Y. Chujo et al. Reversible gelation of polyoxazoline by means of Diels-Alder reaction. Macromolecules, vol. 23, No. 10, 2636-2641, May 1990.*

Chen, X., et al., "A Thermally Re-Mendable Cross-Linked Polymeric Material," *Science* 295:1698-1702, Mar. 1, 2002.

Chen, X., et al., "New Thermally Remendable Highly Cross-Linked Polymeric Materials," *Macromolecules* 36:1802-1807, 2003, no month.

Gheneim, R., et al., "Diels-Alder Reactions With Novel Polymeric Dienes and Dienophiles: Synthesis of Reversibly Cross-Linked Elastomers," *Macromolecules* 35:7246-7253, 2002, no month.

Goiti, E., et al., "Some Observations on the Copolymerization of Styrene With Furfuryl Methacrylate," *Polymer* 42:10187-10193, 2001, no month.

Goiti, E., et al., "Thermal Breakdown by the Retro Diels-Alder Reaction of Crosslinking in Poly[styrene-*co*-(furfuryl methacrylate)]," *Macromolecular Rapid Communications* 24(11):692-696, 2003, no month.

(Continued)

*Primary Examiner*—Michelle Connelly-Cushwa
*Assistant Examiner*—Mike Stahl
(74) *Attorney, Agent, or Firm*—Christensen O'Connor Johnson Kindness PLLC

(57) ABSTRACT

A polymeric cladding material, cladded waveguides, devices that include cladded waveguides, and methods for using the cladding material. The polymeric cladding material is a thermally reversibly crosslinkable polymer having high conductivity above its glass transition temperature.

22 Claims, 8 Drawing Sheets

CLAD2 x=0.408, y=0.051
CLAD3 x=0.306, y=0.102

OTHER PUBLICATIONS

Goussé, C., et al., "Application of the Diels-Alder Reaction to Polymers Bearing Furan Moieties. 2. Diels-Alder and Retro-Diels-Alder Reactions Involving Furan Rings in Some Styrene Copolymers," *Macromolecules* 31:314-321, 1998, no month.

Haller, M., et al., "A Novel Lattice-Hardening Process to Achieve Highly Efficient and Thermally Stable Nonlinear Optical Polymers," *Macromolecules* 37:688-690, 2004, (February).

Kwart, H., and K. King, "The Reverse Diels-Alder or Retrodiene Reaction," *Chemical Reviews* 67:415-447, 1967, no month.

Luo, J., et al., "Design, Synthesis, and Properties of Highly Efficient Side-Chain Dendronized Nonlinear Optical Polymers for Electro-Optics," *Advanced Materials* 14(23):1763-1768, Dec. 3, 2002.

Luo, J., et al., "Highly Efficient and Thermally Stable Electro-Optic Polymer From a Smartly Controlled Crosslinking Process," *Advanced Materials* 15(19):1635-1638, Oct. 2, 2003.

Luo, J., et al., "Recent Progress in Developing Highly Efficient and Thermally Stable Nonlinear Optical Polymers for Electro-Optics," *Proc. SPIE* 5351:36-43, Jun. 2004 (Abstract).

McElhanon, J.R., and D.R. Wheeler, "Thermally Responsive Dendrons and Dendrimers Based on Reversible Furan-Maleimide Diels-Alder Adducts," *Organic Letters.* 3(17):2681-2683, 2001, no month.

Yoon, S.S., and W.C. Still, "Sequence-Selective Peptide Binding With a Synthetic Receptors," *Tetrahedron* 51(2):567-578, 1995, no month.

* cited by examiner

THERMALLY REVERSIBLY CROSSLINKABLE POLYMER AS CLADDING MATERIAL FOR ELECTRO-OPTIC DEVICES

CROSS-REFERENCE TO RELATED APPLICATION

This application claims the benefit of U.S. Patent Application No. 60/602,699, filed Aug. 18, 2004, incorporated herein by reference in its entirety.

STATEMENT OF GOVERNMENT LICENSE RIGHTS

This invention was made with government support under grant F49620-01-1-0364 awarded by the Air Force Office of Scientific Research. The government has certain rights in the invention.

FIELD OF THE INVENTION

The present invention relates to a polymeric cladding material for electro-optic devices. The polymeric cladding material is a thermally reversibly crosslinkable polymer having high conductivity above its glass transition temperature.

BACKGROUND OF THE INVENTION

Nonlinear optical (NLO) materials are used in electro-optic devices to effect efficient processing and transmission of information in optical communications. The NLO materials used in electro-optic devices include inorganic materials, such as lithium niobate, and organic compounds, such as hyperpolarizable organic chromophores.

Organic nonlinear optical materials characteristically provide advantageous properties associated with ultra-fast response times, low dielectric constants, high damage thresholds, and tailorability. The nonlinear optical response of these organic materials is often significantly greater than that of inorganic materials. Moreover, organic materials are considerably more readily fabricated into integrated device structures when used in polymer form.

In the manufacture of these integrated devices, nonlinear optical polymers are cast as films onto substrates by, for example, spin-coating from a solution of the polymer in a solvent. Typical substrate materials that are useful for electro-optic waveguides are inorganic materials such as silicon, gallium arsenide, gallium aluminum arsenide, and indium tin oxide. The fabrication of electro-optic devices incorporating nonlinear optical polymers generally includes the deposition of a plurality of layers of films onto a substrate. A typical electro-optic waveguide device includes a lower electrode layer, a lower cladding layer, an active guiding layer, an upper cladding layer, and an upper electrode layer. Such a device is fabricated by successively depositing and then drying and curing the layers.

The purpose of the cladding layers in an electro-optic device is to confine light in the active guiding layer and to isolate the guiding layer from poling and device operating electrodes. To confine light in the active guiding layer, the refractive index of the materials making up the cladding layer must be lower than that of the nonlinear optical materials of the guiding layer. The difference in the refractive indices must be relatively small to optimize device performance. The small refractive index difference is particularly important for electro-optic modulators that support only a single optical mode.

The nonlinear optical activity of an electro-optic device is optimized by applying an electric field that is localized across the active guiding layer and minimized across the cladding layers. This requires that the electrical resistivity of the materials making up the cladding layer are less than that of the materials making up the active guiding layer.

The optimization of electro-optic devices that utilize organic polymeric materials requires consideration of a variety of factors: control of relative refractive indices of the active guiding layer and the cladding layers; the desired high nonlinear optical activity of the guiding layer; the thermal, photo, and chemical stability of the active guiding layer; optical loss; control of relative electrical resistivities of the active guiding layer and the cladding layers; and the ease of fabrication in spin-coating multiple layers of materials onto a substrate.

One particular problem associated with optimizing the nonlinear optical activity of an active guiding layer in a multi-layered device is that during electric field poling at a temperature higher than the glass transition temperature of the active guiding layer, the conductivity of the cladding material intermediate the poling electrodes and active guiding layer reduces the voltage drop across the core. Maximized NLO activity of the core requires a greater applied poling voltage.

A need exists for cladding materials having increased conductivities, and preferably conductivity greater than that of the active guiding layer such that a greater percentage of the applied poling voltage is dropped across the active guiding layer resulting in a realization of a maximized NLO activity in the active guiding layer while minimizing applied poling voltage. The present invention seeks to fulfill this need and provides further related advantages.

SUMMARY OF THE INVENTION

In one aspect, the invention provides a cladding for a waveguide, comprising a thermally reversibly crosslinked polymer. The crosslinked polymer comprises one or more 4+2 cycloaddition moieties, the 4+2 cycloaddition moieties being reactive to form diene and dienophile moieties. Above the crosslinked polymer's glass transition temperature, the crosslinked polymer reverts to its precursor crosslinkable polymer. The conductivity of the crosslinkable polymer is greater than the conductivity of the crosslinked polymer.

In another aspect of the invention, a cladded waveguide is provided. The cladded waveguide comprises (a) a waveguide and (b) a cladding, comprising a thermally reversibly crosslinked polymer, wherein the cladding is adapted to provide internal reflectance of light transmitted through the waveguide. The cladding has a conductivity greater than the conductivity of the waveguide at the waveguide's glass transition temperature. In one embodiment, the waveguide is a passive waveguide. In another embodiment, the waveguide is an active waveguide. In one embodiment, the active waveguide comprises a nonlinear optically active material.

In a further aspect, the invention provides an electro-optic device comprising a cladded waveguide. The cladded waveguide comprises (a) a waveguide, and (b) a cladding, comprising a thermally reversibly crosslinked polymer. The cladding has a conductivity greater than the conductivity of the waveguide at the waveguide's glass transition temperature. In one embodiment, the waveguide comprises a nonlinear optically active material.

In another aspect of the invention, an electro-optic device is provided. The device comprises (a) a first electrode; (b) a second electrode; (c) a waveguide intermediate the first and second electrodes, wherein the waveguide comprises an alignable nonlinear optically active material; (d) a first cladding intermediate the waveguide and the first electrode, wherein the first cladding comprises a thermally reversibly crosslinked polymer; and (e) a second cladding intermediate the waveguide and the second electrode, wherein the second cladding comprises a thermally reversibly crosslinked polymer. The first and second claddings each have a conductivity greater than the conductivity of the waveguide at the waveguide's glass transition temperature.

In another aspect, the invention provides a method for aligning a nonlinear optically active material in a waveguide by electric field poling. The method includes the steps of (a) heating a cladded waveguide to the waveguide's glass transition temperature, the waveguide comprising (i) a waveguide comprising an alignable nonlinear optically active material, and (ii) a cladding comprising a thermally reversibly crosslinked polymer; (b) applying an electric field to the cladded waveguide thereby aligning at least a portion of the alignable nonlinear optically active material; and (c) cooling the cladded waveguide to provide a waveguide having aligned nonlinear optically active material. The cladding has a conductivity greater than the conductivity of the waveguide at the waveguide's glass transition temperature.

In a further aspect of the invention, a thermally reversibly crosslinkable polymer is provided. The polymer consists essentially of one or more diene moieties and one or more dienophile or dienophile precursor moieties, wherein the diene and dienophile moieties are reactive to form 4+2 cycloaddition moieties. In another aspect, the invention provides a crosslinkable polymer consisting essentially of one or more diene moieties, one or more dienophile or dienophile precursor moieties, and one or more moieties for controlling the glass transition temperature of the polymer, wherein the diene and dienophile moieties are reactive to form 4+2 cycloaddition moieties. The crosslinkable polymer provides a thermally reversibly crosslinked polymer that reverts to its precursor crosslinkable polymer above the crosslinked polymer's glass transition temperature. The dienophile moieties comprise maleimide moieties or substituted maleimide. The diene moieties comprise furan moieties or substituted furan moieties. The moieties for controlling the glass transition temperature of the polymer comprise fluorinated phenyl moieties.

In a further aspect, the invention provides a thermally reversibly crosslinked polymer consisting essentially of one or more 4+2 cycloaddition moieties; wherein the 4+2 cycloaddition moieties are reactive to form one or more diene moieties and one or more dienophile moieties. In another aspect, the invention provides a crosslinked polymer consisting essentially of one or more diene moieties, one or more dienophile or dienophile precursor moieties, and one or more moieties for controlling the glass transition temperature of the polymer, wherein the diene and dienophile moieties are reactive to form 4+2 cycloaddition moieties. The crosslinked polymer is a thermally reversibly crosslinked polymer that reverts to its precursor crosslinkable polymer above the crosslinked polymer's glass transition temperature. The dienophile moieties comprise maleimide moieties or substituted maleimide. The diene moieties comprise furan moieties or substituted furan moieties. The moieties for controlling the glass transition temperature of the polymer comprise fluorinated phenyl moieties.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7A and 7B illustrate representative electro-optic devices of the invention that include a thermally reversibly crosslinkable polymer as the cladding layer;

FIGS. 8A and 8B illustrate representative electro-optic devices of the invention that include a thermally reversibly crosslinkable polymer as the cladding layer.

DETAILED DESCRIPTION OF THE PREFERRED EMBODIMENT

The present invention provides a cladding material and method for using the material in waveguides. The cladding material is a thermally reversibly crosslinked polymer having low optical loss that can be reverted to its linear (non-crosslinked and crosslinkable) precursors on heating. Because the crosslinked polymer can be reverted to its linear precursors on heating, the polymer has greater conductivity at temperatures above its glass transition temperature ($T_g$).

The cladding material of the invention is suitable for cladding passive waveguides and active waveguides. The term "cladding" refers to a sheath or surround structure adjacent and in optical communication with a waveguide. As used herein the term "passive waveguide" refers to a waveguide (or lightguide) that serves to transmit light and that does not include optically active materials. The term "active waveguide" refers to a waveguide (or lightguide) that transmits light and also includes an optically active material (e.g., nonlinear optical chromophores or polymers). The terms "waveguide" and "lightguide" are used synonymously herein.

In one embodiment, the cladding material is effective in cladding an active waveguide. The combination of the thermally reversibly crosslinked cladding material (low $T_g$ polymer) with nonlinear optical (NLO) active core materials (high $T_g$ NLO chromophores or polymers) can introduce significant conductivity difference between the cladding and core materials. Therefore, electric field poling at the higher temperature to orient active materials in the core results in an increase in conductivity of the cladding material and provides for dropping the majority of the applied voltage across the core, thereby realizing maximized nonlinear optical activity for the core with minimized applied poling voltage. The achievement of high optical nonlinearities for multi-layered devices is achieved by the cladding materials of the invention.

The guidance of light through a waveguide is determined by the material making up the waveguide and wavelength of light transmitted through the waveguide. The refractive index of the waveguide and its associated cladding determines the properties of the waveguide. At the interface of the waveguide and cladding having a difference in refractive index (i.e., index contrast) light is refracted toward the higher index medium (i.e., the waveguide) by an angle related to the relative indices of the two materials (Snell's Law). Light traveling in the medium of higher refractive index (i.e., the waveguide) that impinges the medium of lower refractive index (i.e., the cladding) at an angle less than the critical angle is totally reflected. Waveguides rely on this principal, total internal reflectance, to transmit light over long distances without radiative losses.

The purpose of a cladding in an electro-optic device is to confine light in the active waveguide and to isolate the waveguide from poling and device operating electrodes. As noted above, to confine light in the active waveguide, the refractive index of the materials that make up the cladding must be lower than that of the waveguide, which includes nonlinear optical materials. To optimize device performance, the difference in the refractive indices of the waveguide and cladding should be relatively small.

In one aspect, the present invention provides a crosslinkable polymer. In one embodiment, the crosslinkable polymer is a polystyrene-based polymer having pendant functional groups that include diene groups (e.g., furan) and latent dienophile groups (e.g., "capped" maleimide). The crosslinkable polymer can be crosslinked through a Diels-Alder (4+2 cycloaddition) reaction between proximate diene and dienophile groups to provide a hardened (crosslinked) host lattice. On further heating, the crosslinked polymer can be reverted to its linear precursor (i.e., the crosslinkable polymer) through a retro-Diels-Alder reaction.

In another aspect of the invention, crosslinked polymers are provided. The crosslinked polymers of the invention are provided by the Diels-Alder [4+2] cycloaddition reaction of the crosslinkable polymers, which is carried out during lattice hardening. In one embodiment, the crosslinked polymers are inter-polymer crosslinked (e.g., crosslinks formed by a diene moiety of a first polymer reacting with a dienophile moiety of a second polymer to provide a [4+2] cycloaddition moiety). The Diels-Alder (DA) reaction involves covalent coupling of a "diene" with a "dienophile" to provide a cyclohexene cycloadduct. See, for example, Kwart, H., and K. King, *Chem. Rev.* 68:415, 1968. Most DA cycloadditions can be described by a symmetry-allowed concerted mechanism without generating the biradical or zwitterion intermediates. A feature of the DA reaction is that the resultant adducts can be reversibly thermally cleaved to regenerate the starting materials (i.e., diene and dienophile). For example, the retro-DA reaction has been exploited to thermally crosslink linear polymers that are capable of reverting to their thermoplastic precursors by heating. See, for example, (a) Chen, X., et al., *Science* 295:1698, 2002; (b) Gousse, C., et al., *Macromolecules* 31:314, 1998; (c) McElhanon, J. R., and D. R. Wheeler, *Org. Lett.* 3:2681, 2001.

Figure 2:
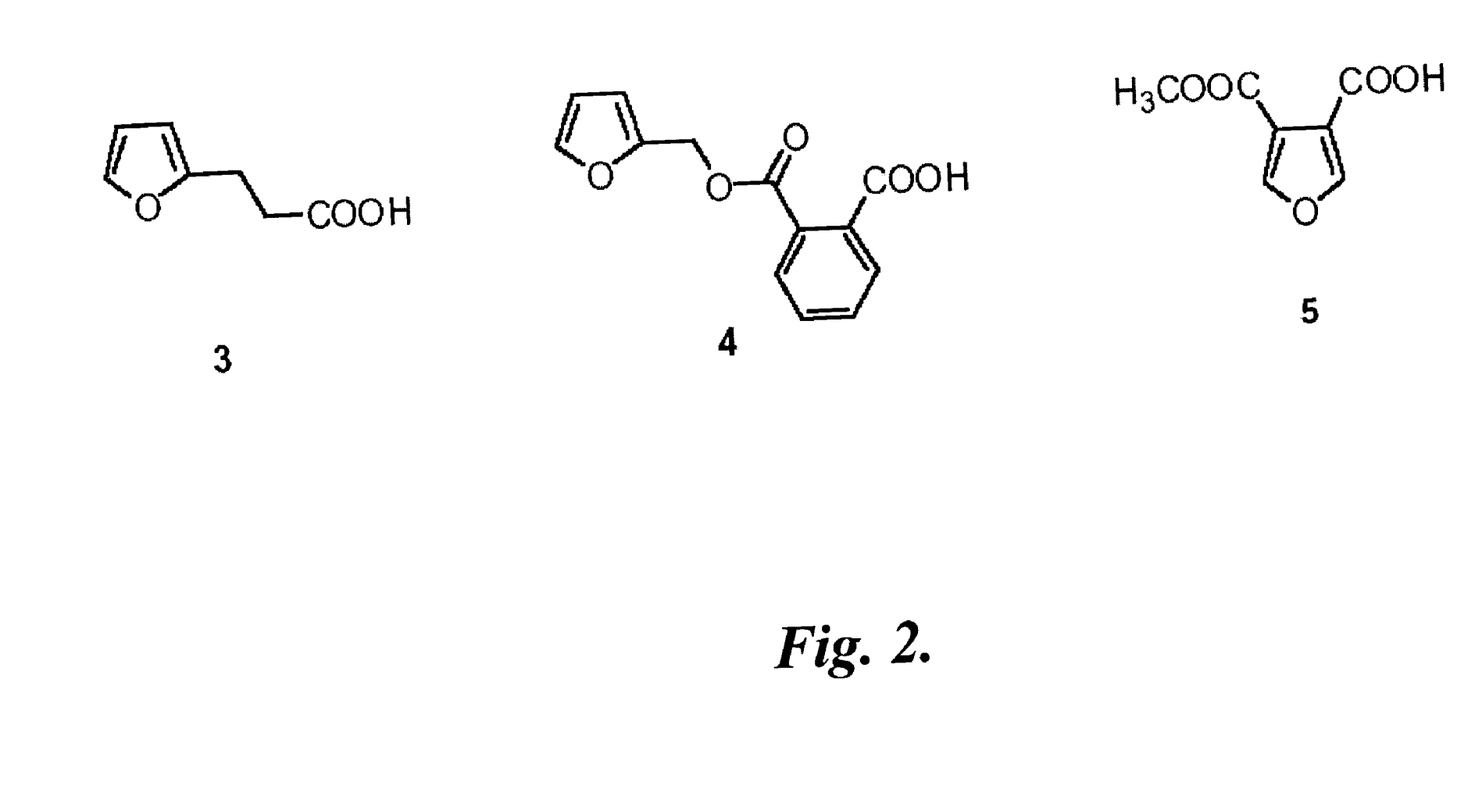
FIG. 2 is an illustration of the chemical structures of furan compounds useful in making the thermally reversibly crosslinkable polymers of the invention.

The crosslinkable polymers include one or more diene moieties. As used herein, the term "diene" refers to a 1,3-diene that is reactive toward a dienophile to provide a 4+2 (Diels-Alder) cycloaddition product (i.e., a cyclohexene). Suitable diene moieties include any diene (i.e., 1,3-diene) moiety that is reactive in forming a 4+2 cycloaddition product with a dienophile. As noted above, the diene moiety is covalently coupled to the polymer backbone by the reaction of a suitable functional group on the diene moiety (e.g., carboxyl group) with a suitable functional group on the polymer (i.e., phenolic hydroxyl group). In one embodiment, the diene moiety includes a furan moiety. Representative diene moieties include furan moieties. Representative furan derivatives useful in making the crosslinkable polymers of the invention are illustrated in FIG. 2. Referring to FIG. 2, furans 3 and 4 are thermally reversibly Diels-Alder reactive having an association temperature in the range of from about 80° C. to about 90° C. and a dissociation temperature in the range of from about 115° C. to about 135° C., and furan 5 is thermally irreversibly Diels-Alder reactive having an association temperature in the range of from about 80° C. to about 90° C.

The crosslinkable polymers also include one or more dienophile or dienophile precursor moieties. The term "dienophile" refers to an alkene that is reactive toward a diene to provide a 4+2 cycloaddition product. The term "dienophile precursor" refers to a moiety that can be converted to a dienophile. Suitable dienophile moieties include any dienophile moiety that is reactive in forming a 4+2 cycloaddition product with a diene. Suitable dienophile precursor moieties include any dienophile precursor moiety that provides a dienophile that is reactive in forming a 4+2 cycloaddition product with a diene. In one embodiment, the dienophile moiety includes a maleimide moiety. In one embodiment, the dienophile precursor moiety includes a capped maleimide moiety (e.g., furan-capped maleimide). Representative dienophile moieties include maleimide moieties.

Suitable dienes and dienophiles (and dienophile precursors) may be unsubstituted or substituted.

The crosslinkable polymer's dienes and dienophiles may be selected for their reactivity profile to suit a particular cladding application. Reactivity profile refers to the reaction conditions (e.g., temperature) required to associate the diene and dienophile to from a [4+2] cycloadduct (i.e., Diels Alder reaction) and to dissociate the [4+2] cycloadduct to form the diene and dienophile (i.e., retro-Diels-Alder reaction). The chemical nature of the diene and dienophile (e.g., substituents and substitution pattern) determine the reactivity profile. For example, referring to FIG. 2, furan 3 (i.e., 3-(2-furyl)propanoic acid) and furan 4 (i.e., methyl-2-furyl-2-carboxybenzoate) undergo Diels-Alder reaction with unsubstituted maleimides at temperatures between about 80-90° C. and the corresponding [4+2] cycloaddition products undergo retro-Diels-Alder reaction at about 115-135° C. In contrast, furan 5 (i.e., 3-carboxy-4-carbomethoxyfuran) undergoes irreversible Diels-Alder reaction with unsubstituted maleimides at temperatures between about 80-90° C.

The polymers useful in the method of the invention may be any one of a variety of polymers that include the diene and dienophile (or dienophile precursor) moieties. Suitable polymers include homopolymers, copolymers, block copolymers, and graft copolymers. In one embodiment, the polymer is a homopolymer to which has been grafted the diene and dienophile (or dienophile precursor) moieties. In one embodiment, the polymer is a copolymer to which has been grafted the diene and dienophile (or dienophile precursor) moieties. In one embodiment, the polymer has a functional group that is suitable for reaction with suitably functionalized diene and dienophile (or dienophile precursor) compound to covalently couple the diene and dienophile (or dienophile precursor) moieties to the polymer backbone.

The polymers may be prepared through grafting, for example, by covalently coupling a diene moiety and a dienophile (or dienophile precursor) moiety to a polymer backbone, where a suitable functional group (e.g., carboxyl group) on the diene moiety and dienophile (or dienophile precursor) moiety reacts with a suitable functional group on the polymer (e.g., phenolic hydroxyl group). Alternatively, the polymer may be prepared by reacting a diene (or diene precursor) containing a polymerizable group, and a dienophile (or dienophile precursor) containing a polymerizable group to form a polymer. Combinations of polymerizing and grafting may also be used. Representative polymers useful in making the crosslinkable polymers of the invention include poly(vinylphenol) polymers, polyvinyl polymers, and amorphous polycarbonate polymers.

Figure 3:
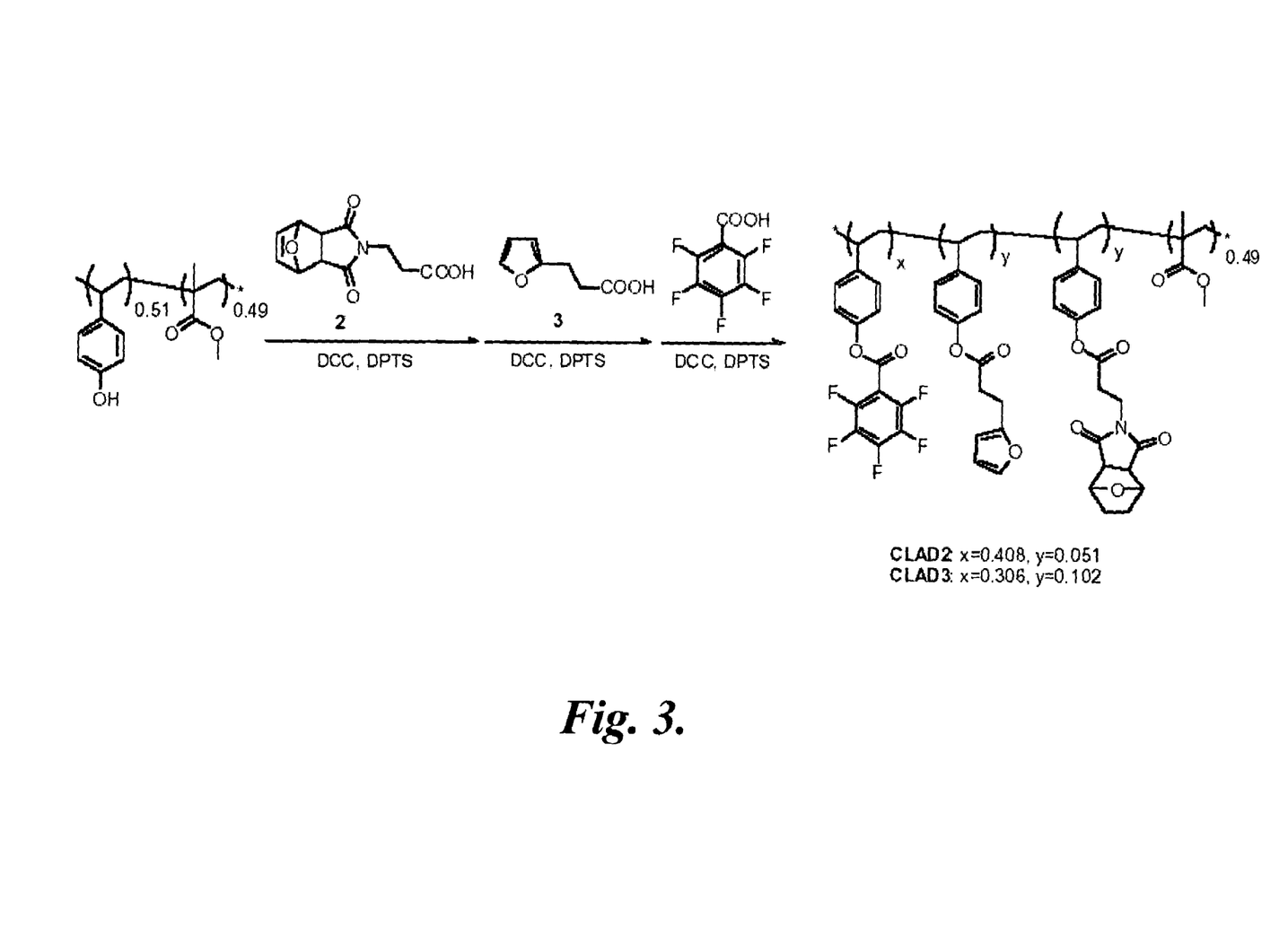
FIG. 3 is a schematic illustration of the preparation of a representative thermally reversibly crosslinkable polymer of the invention.
Figure 5:
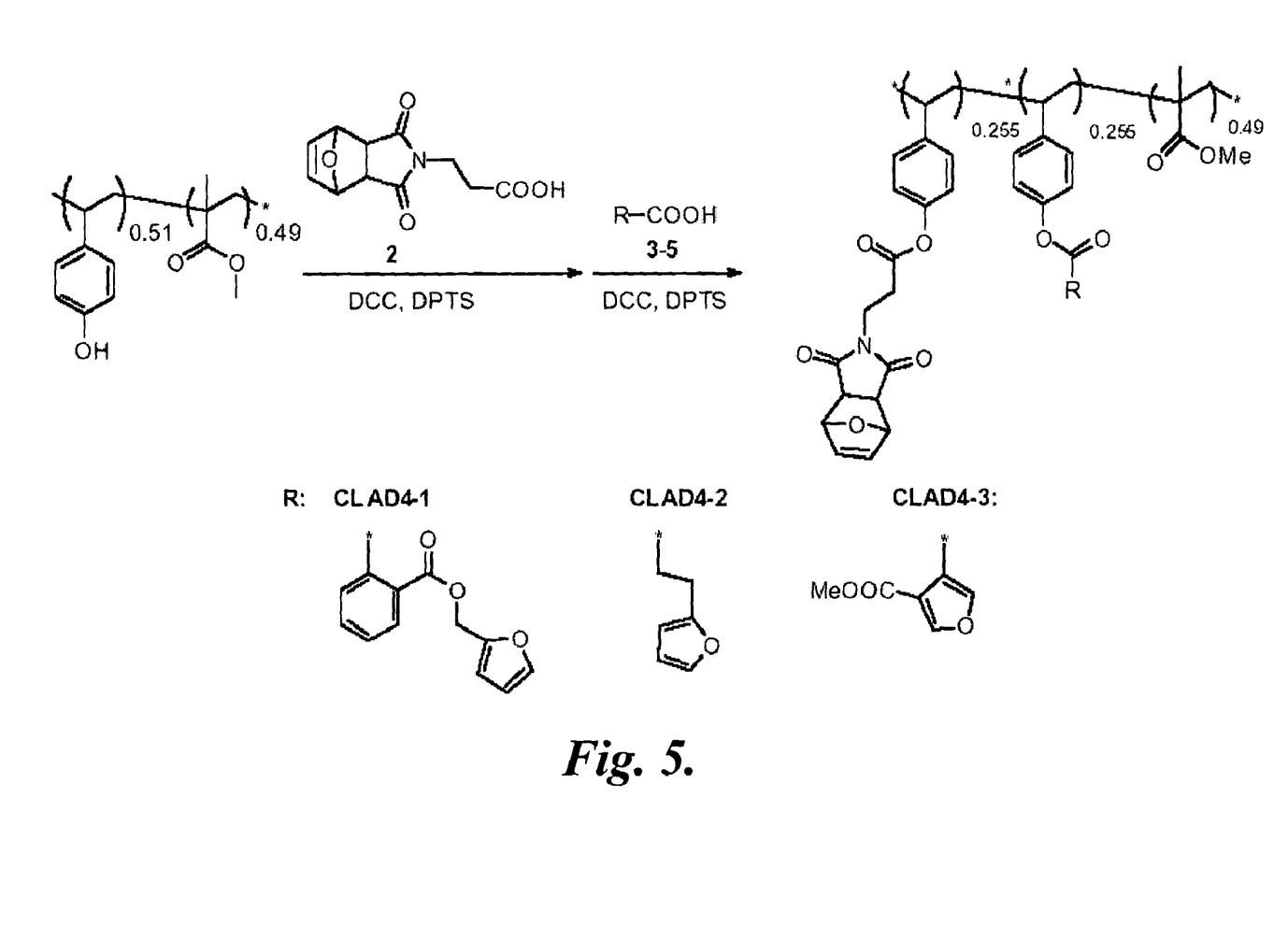
FIG. 5 is a schematic illustration of the preparation of representative thermally reversibly crosslinkable polymers of the invention.

The syntheses of a representative crosslinkable polymers useful in the cladding materials of the invention are described in Examples 2-5 and illustrated schematically in FIGS. 3 and 5. FIG. 3 illustrates the preparation of poly(4-vinylphenol)-based polymers (CLAD2 and CLAD3) that include a dienophile precursor (i.e., masked maleimide) moiety and a diene (i.e., furan) moiety. FIG. 5 illustrates the preparation of poly(4-vinylphenol)-based polymers (CLAD4-1, CLAD4-2, and CLAD4-3) that include a dienophile precursor (i.e., masked maleimide) moiety and a diene (i.e., furan) moiety.

The crosslinkable polymers illustrated in FIGS. 3 and 5 are graft copolymers having a polymer backbone to which are grafted pendant groups. The polymer backbone includes 4-vinylphenol and methyl methacrylate repeating units. The backbone copolymer is prepared by the copolymerization of 4-vinylphenol and methyl methacrylate. As illustrated in FIG. 3, the copolymer starting material includes about equal numbers of each repeating unit: 0.51 mole percent 4-vinylphenol and 0.49 mole percent methyl methacrylate. It will also be appreciated that the 4-vinylphenol and methyl methacrylate repeating units do not necessarily occur in blocks as depicted schematically in FIG. 3.

The crosslinkable polymer's pendant groups are grafted to the polymer backbone by covalent coupling. As illustrated in FIG. 3, the dienophile precursor (protected maleimide) is covalently coupled to the polymer backbone through esterification of the polymer's phenolic group by the modified maleimide's carboxylic acid group; the diene (furan) is similarly covalently coupled to the polymer backbone through esterification of the polymer's phenolic group by the modified furan's carboxylic acid group; and pentafluorobenzoic acid is covalently coupled to the polymer backbone through esterification of the polymer's phenolic group by the benzoic acid's carboxylic acid group. The benzoic acid is included to control the amount of diene and dienophile (or dienophile precursor) incorporated into the polymer. It will be appreciated that other groups are suitable. Pentafluorobenzate is non-reactive and has favorable communication properties at telecommunication wavelengths.

As illustrated in FIG. 3, the representative crosslinkable polymer includes x mole percent pendant pentafluorophenyl groups, y mole percent furan groups, and y mole percent capped maleimide groups, with x=0.408 and y=0.051 for CLAD2, and with x=0.306 and y=0.102 for CLAD3. It will be appreciated that the phenyl, furan, and capped maleimide groups do not necessarily occur in blocks as depicted schematically in FIG. 3. It will also be appreciated that the ratio of x:y can vary depending on the desired extent of crosslinking.

Although a representative polymer is described as having the specific components noted above, it will be appreciated that the polymers of the invention can include a variety of dienophiles and dienes.

In the synthesis of the polymer, the maleimide (dienophile) is protected with furan to prevent any crosslinking reaction from occurring prior to the lattice hardening step. The resultant polymer possesses good solubility in common organic solvents, such as chloroform and THF. The polymer was characterized by $^1$H NMR, $^{19}$F NMR, UV-Vis spectroscopy, GPC, and thermal analysis, as described in the Example 2.

Figure 6:
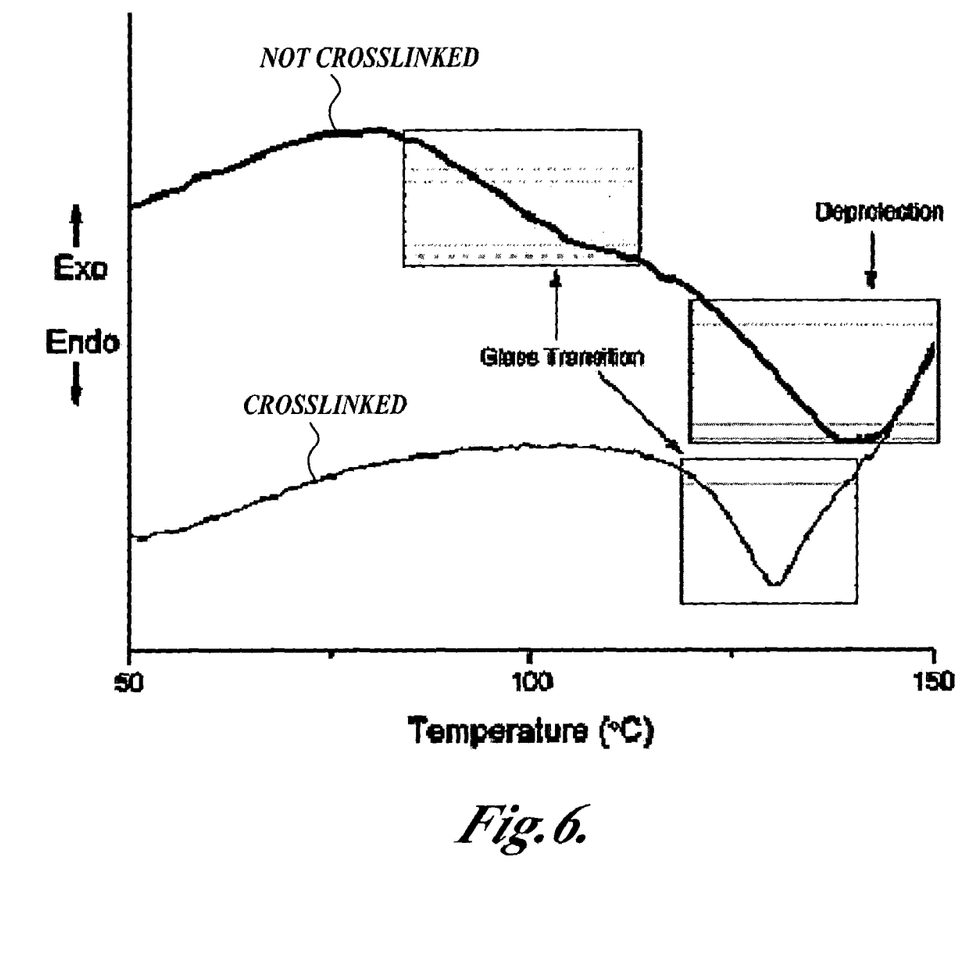
FIG. 6 illustrates differential scanning calorimetry scans of a representative thermally reversibly crosslinkable polymer of the invention before and after crosslinking.

The furan used for protecting the maleimide moiety is thermally cleaved by retro-DA reaction and easily evaporated from the polymer to provide the maleimide moiety as dienophile. The loss of furan and the formation of the maleimide moiety as dienophile can be clearly verified by thermal analysis. FIG. 6 is a graph illustrating the thermal analysis of a representative polymer before and after crosslinking. Thermal analysis by differential scanning calorimetry (DSC) shows an endothermic peak observed in the temperature range from 110° C. to 150° C., which corresponds to maleimide deprotection. Differential scanning calorimetry demonstrates the difference between the initial, furan protected, non-crosslinked polymer and the deprotected, hardened material. A shift in glass transition temperature of +50° C. is shown.

Figure 1:
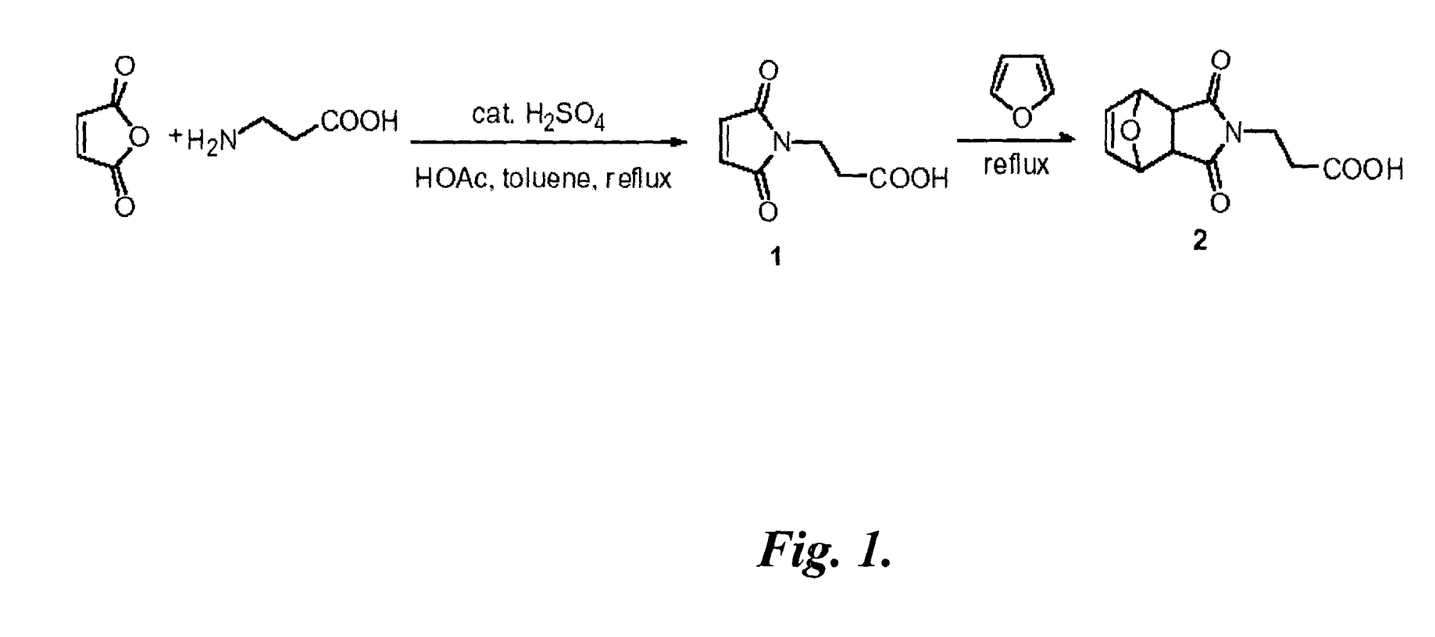
FIG. 1 is a schematic illustration of the preparation of a furan protected maleimide useful in making the thermally reversibly crosslinkable polymers of the invention.

As the key intermediate towards preparation of Diels-Alder crosslinkable side-chain polymers, furan protected dienophile N-carboxyethylmaleimide 2 was synthesized as shown in FIG. 1. Maleic anhydride was reacted with β-alanine in acetic acid solution with concentrated sulfuric acid as a catalyst to afford condensed N-carboxyethylmaleimide 1 as white solid (55% yield). The resulting maleimide 1 was further reacted with furan to afford the Diels-Alder adduct 2 as the protected maleimide. Dienes 3-5 were selected based on their thermal process windows (i.e., reversible or irreversible crosslink mechanism of the Diels-Alder adduct) and the density of aromaticity, which may adjust the glass transition temperature ($T_g$) and dielectric constant of the resulting polymers. The chemical structures of dienes 3-5 are illustrated in FIG. 2. Furans 3 and 4 provide polymers that are thermally reversibly crosslinkable. Furan 5 provides a polymer that is thermally irreversibly crosslinkable.

Representative thermally crosslinkable polymers were prepared by a post-functionalization protocol with 1,3-dicyclohexylcarbodiimde (DCC) and 4-(dimethylamino) pyridinium 4-toluenesulfonate (DPTS) as the coupling reagents. To significantly reduce optical loss of the polymers as a cladding layer in a multilayer waveguide device, pentafluorobenzoic acid was grafted to the polymer as the endcap pendant to prevent remaining free phenol groups on polymer chain from inducing O—H overtone loss at waveguide operation wavelengths. The preparation of representative thermally reversibly crosslinkable polymers of the invention are illustrated in FIGS. 3 and 5.

By using the DCC/DPTS combination, free phenol groups on poly(4-vinylphenol-co-methyl methacrylate) (MW=7.2K, DPI=2.1) were reacted with dienophile 2, diene 3, and pentafluorobenzoic acid sequentially to afford the polymer CLAD2 (5.1 mole percent diene and dienophile) and CLAD3 (10.2 mole percent diene and dienophile) having glass transition temperatures of 126° C. and 137° C., respectively. See FIG. 3. The molecular weights of these polymers increased slightly from copolymer starting material without significant changes of molecular weight distributions.

The resulting polymers were then crosslinked for solvent resistivity test by thermal crosslinking under nitrogen. The samples were heated to 150° C. at rate of 110° C./min, equilibrated for 10 minutes, cooled to 80° C. at rate of 110° C./min., equilibrated for 20 minutes and then cooled down to room temperature for testing. Crosslinked CLAD2 samples were emerged in solvents commonly used in the waveguide fabrication such as, cyclopentanone, THF, and ethylene glycol dimethyl ether, and exhibited poor solvent resistivity. Apparently, 5.1 mole percent loading levels of diene and dienophile in CLAD2 were not sufficiently high to ensure sufficient crosslink density of the Diels-Alder adduct. In contrast, when the diene and dienophile loadings were doubled to 10.2 mole percent in CLAD3, the crosslinked samples demonstrated excellent solvent resistivity: completely insoluble and no sign of dilation after 24 hours.

Figure 4:
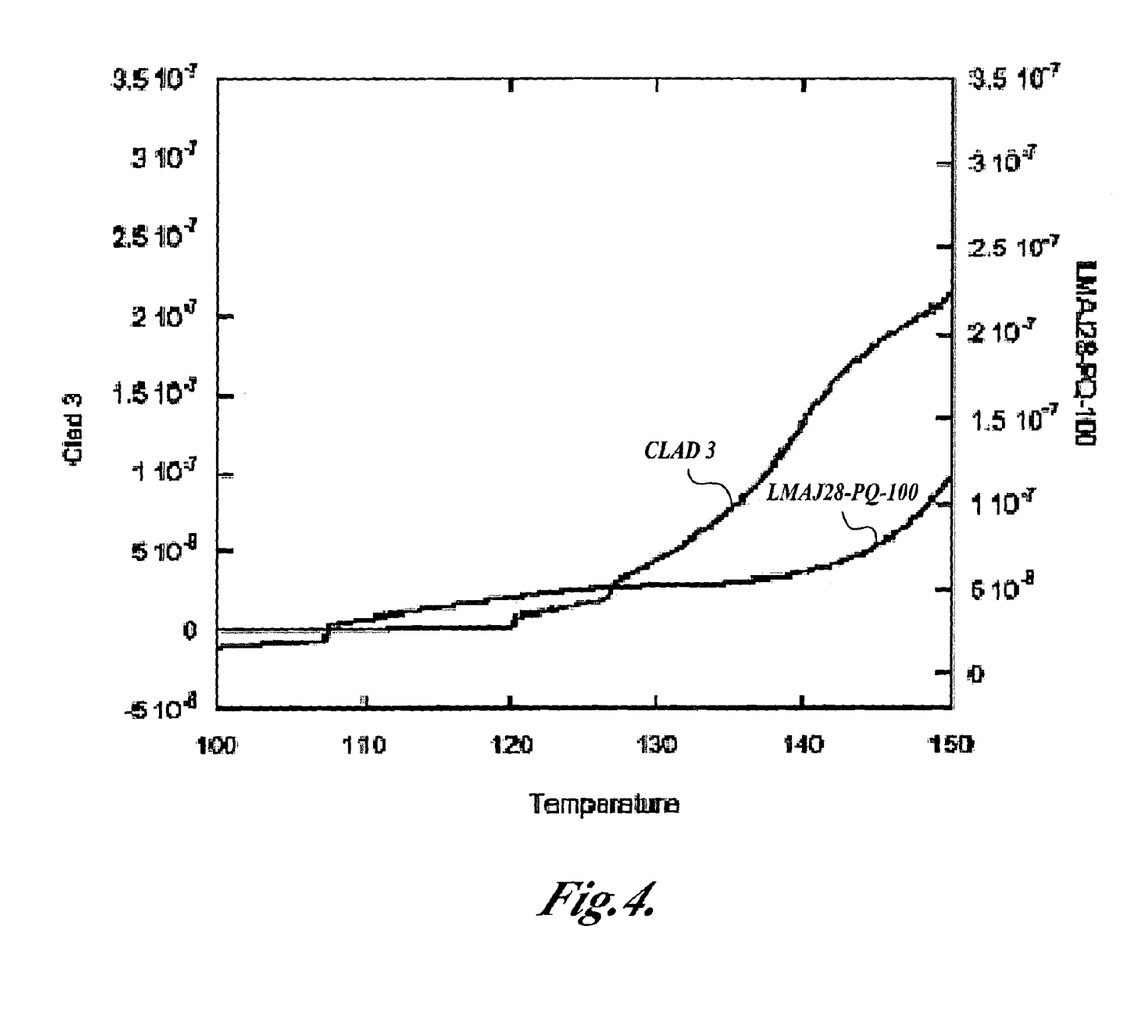
FIG. 4 is a graph comparing the conductivity as a function of time for a representative thermally reversibly crosslinkable polymer of the invention and a polymer composite.

Polymer conductivity measurements were carried out on crosslinked CLAD3 samples. A polymer solution (18 weight percent CLAD3) in cyclopentanone was spin-coated onto an ITO coated glass substrate. The resulting thin film was soft baked at 65° C. for 30 minutes under air, then transferred to a vacuum oven to hard bake at 85° C. overnight to afford an optical quality film having a refractive index of 1.52 at 1.3 µm. A layer of gold was evaporated on top of polymer film as the contact electrode. The sandwiched polymer film between ITO and gold electrodes was heated to 150° C. at rate of 10° C./min, to allow the dissociation of furan of the protected maleimide 2 moiety, then cooled to 80° C. at rate of 10° C./min to allow the Diels-Alder counterparts (diene and dienophile) to react for 30 minutes, then cooled down to room temperature. To the crosslinked sample was then applied a DC voltage of 30 V/µm while heating to 250° C. at rate of 1° C./min. The conductivity of the sample was monitored while heating. The results are shown in FIG. 4.

As a control sample, the conductivity of core layer material, polymer composite LMAJ28/PQ-100, was tested under the same conditions. Compared to the core layer polymer composite with active chromophore, the conductivity of CLAD3 remained low until 128° C., at which temperature its conductivity exceeded that of LMAJ28/PQ-100 and increased exponentially with elevated temperature beyond 130° C. The conductivity of CLAD3 is approximately three times that of core layer material at 140-145° C., which is the window of poling temperature for core layer. The voltage applied to the core layer would be significantly greater than that applied onto cladding layer when they are integrated in the same waveguide structure. This result demonstrates the utility of CLAD3 as a cladding layer in a waveguide, which may permit higher poling efficiency compared to a waveguide using conventional cladding polymer.

To further enhance the physical properties of the thermally reversibly crosslinkable polymer as cladding material in a waveguide device, additional CLAD derivatives were prepared and evaluated. Using maleimide 2, furan dienes 3-5 were employed to adjust critical material properties such as, solvent resistivity to the core material solution, refractive index, and thermal process. Cladding polymers CLAD4-1, CLAD4-2, and CLAD4-3 incorporating 25.5 mole percent diene and dienophile were prepared as illustrated in FIG. 5. CLAD4-1 and CLAD4-2 are thermally reversibly crosslinkable polymers, while CLAD4-3 is a thermally irreversible crosslinkable polymer (i.e., the CLAD4-3 Diels-Alder adduct does not revert to diene and dienophile after thermal treatment at 80° C.). The thermally irreversible crosslinking is believed to result from the pendant furan's deactivating ester substituent.

In another aspect, the invention provides an electro-optic device that includes the thermally reversibly crosslinkable polymer noted above as a cladding for a waveguide. In the device, the cladding surrounds the waveguide (i.e., the passive or active core) to confine light to the waveguide and to isolate the waveguide from the poling and device operating electrodes.

In one embodiment, the electro-optic device includes a first electrode, a first cladding layer, a waveguide (i.e., active or passive core), a second cladding layer, and a second electrode. The materials of the first and second cladding layers may be the same or may be different. In this embodiment, the waveguide is isolated from the first and second electrodes by intermediate cladding layers (i.e., the first cladding layer isolates the core from the first electrode and the second cladding layer isolates the core from the second electrode). Schematic illustrations of electro-optic devices having a core intermediate first and second cladding layers are shown in FIGS. 7A, 7B, 8A, and 8B.

Figure 7A:
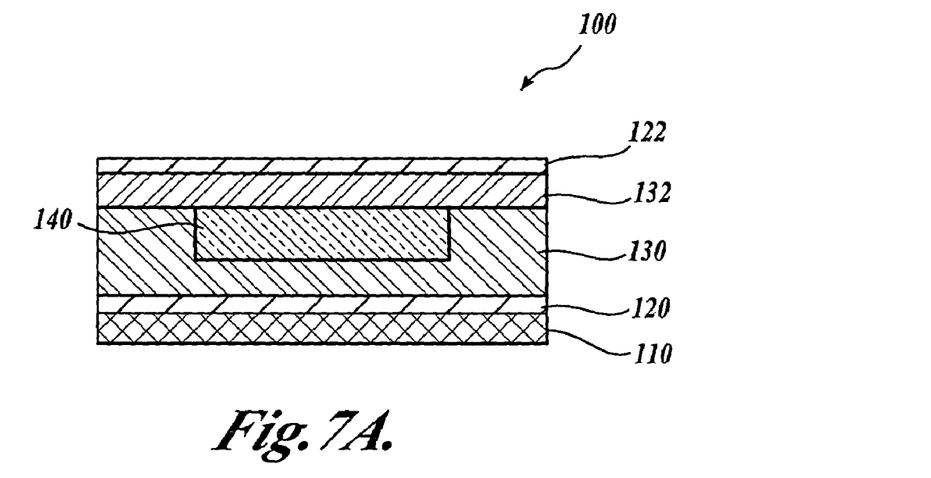
FIG. 7A is a cross-sectional view of a representative electro-optic device in which the light guiding core is fabricated as a channel through etching.
Figure 7B:
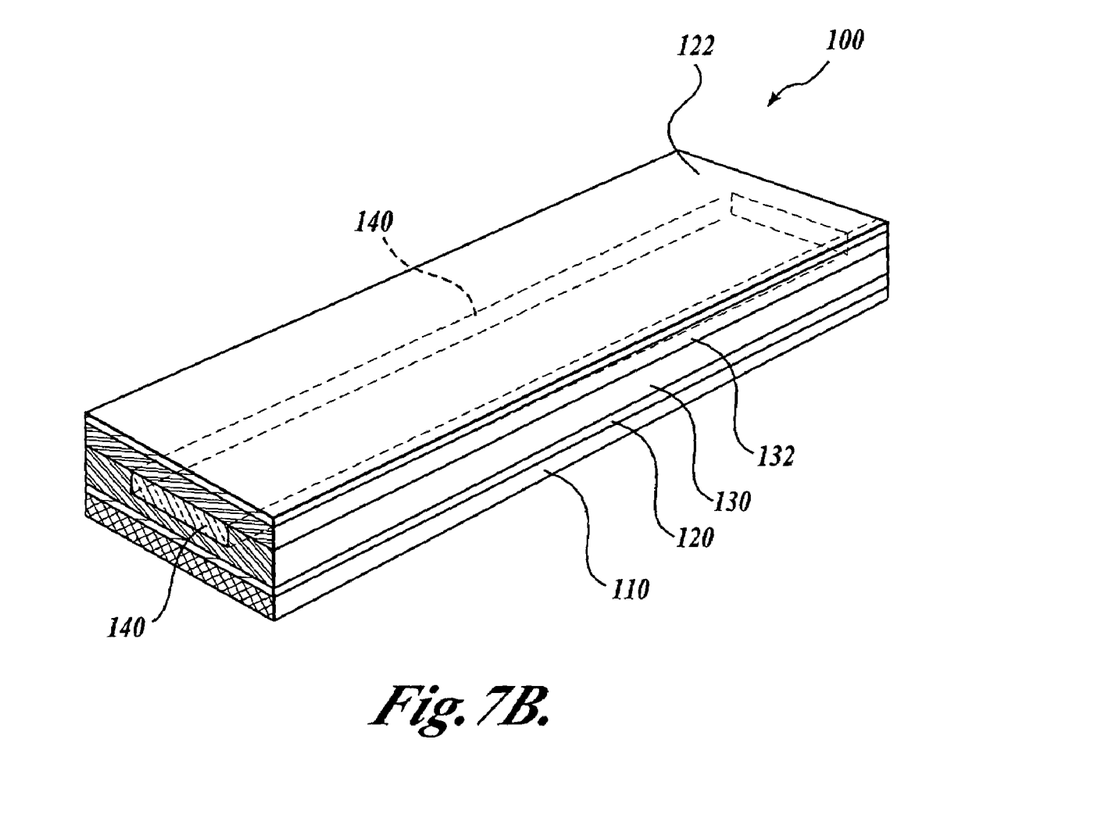
FIG. 7B is a perspective view of the electro-optic device illustrated in FIG. 7A.

Referring to FIGS. 7A and 7B, representative electro-optic device 100 includes substrate 110, and first electrode 120 and second electrode 122 isolated from core 140 by cladding layers 130 and 132, respectively. Device 100 can be fabricated by forming a first electrode (120) on a substrate (110) followed by forming a cladding layer on the electrode. A channel (trench) is etched in the cladding layer for receiving the core material. The core material can be delivered by, for example, spin-casting the core material into the channel to provide the waveguide core (140). Cladding layer 132 is then formed on the surface comprised of core 140 and first cladding layer 130, followed by formation of second electrode 122 on cladding layer 132. The first and second cladding layers may be the same or different.

Figure 8A:
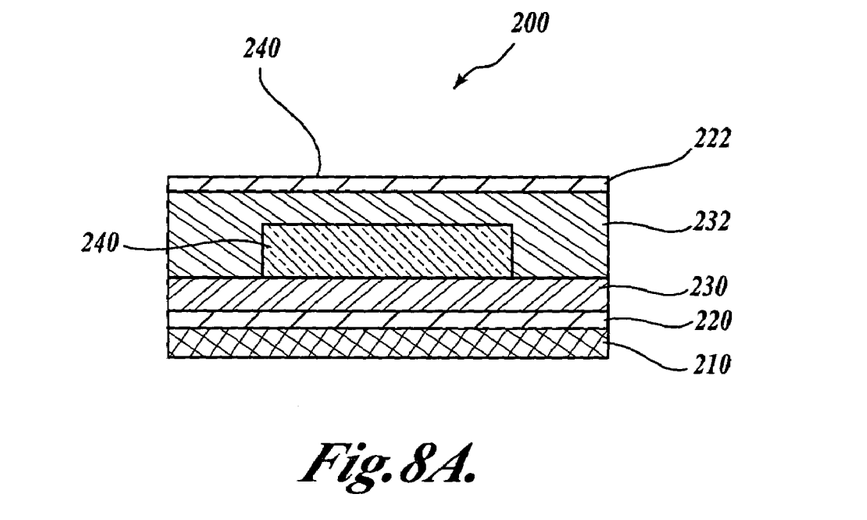
FIG. 8A is a cross-sectional view of a representative electro-optic device in which the light guiding core is fabricated as a rib through masking.
Figure 8B:
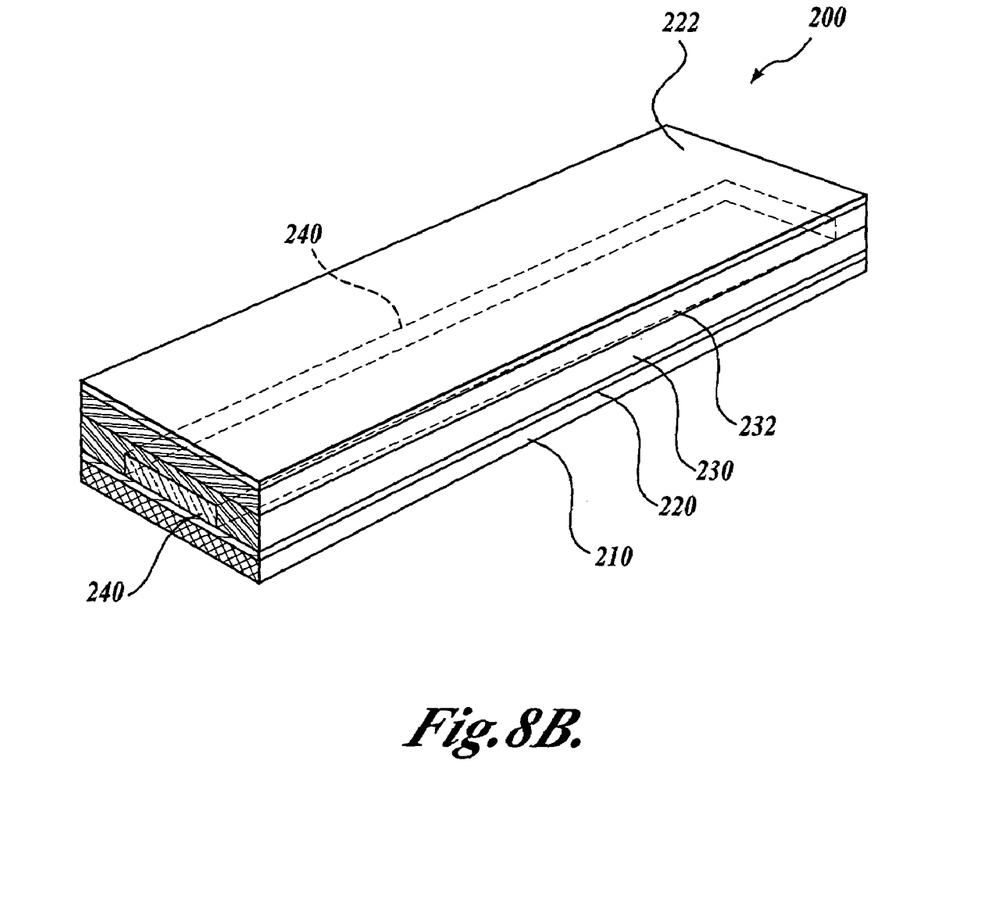
FIG. 8B is a perspective view of the electro-optic device illustrated in FIG. 8A.

Referring to FIGS. 8A and 8B, representative electro-optic device 200 includes substrate 210, and first electrode 220 and second electrode 222 isolated from core 240 by cladding layers 230 and 232, respectively. Device 200 can be fabricated by forming a first electrode (220) on a substrate (210) followed by forming a cladding layer (230) on the electrode. The core material can be delivered on cladding layer 230 by, for example, selectively masking the surface of cladding layer 230 and then delivering the core material by, for example, spin-casting the core material onto the unmasked portion of cladding layer 230 to provide the waveguide core (240) as a rib. Cladding layer 232 is then formed on the surface comprised of core 240 and first cladding layer 230, followed by formation of second electrode 222 on cladding layer 232.

In one embodiment, the active waveguide (i.e., core layer) includes one or more nonlinear optical (NLO) active materials. NLO materials include organic NLO materials, such as NLO chromophore compounds (polarizable chromophores) and polymers that include polarizable chromophore groups. As used herein, the term "chromophore" refers to a compound that can absorb a photon of light. The term "nonlinear" refers second order effects that arise from the nature of the polarizable chromophore (i.e., "push-pull" chromophore) having the general structure D-π-A, where D is an electron donor, A is an electron acceptor, and π is a π-bridge that conjugates the donor to the acceptor.

A "donor" (represented by "D") is an atom or group of atoms with low electron affinity relative to an acceptor (defined below) such that, when the donor is conjugated to an acceptor through a π-bridge, electron density is transferred from the donor to the acceptor.

An "acceptor" (represented by "A") is an atom or group of atoms with high electron affinity relative to a donor such that, when the acceptor is conjugated to a donor through a π-bridge, electron density is transferred from the acceptor to the donor.

A "π-bridge" or "conjugated bridge" (represented in chemical structures by "π" or "π'" where n is an integer) is comprised of an atom or group of atoms through which electrons can be delocalized from a donor to an acceptor through the orbitals of atoms in the bridge. Preferably, the orbitals will be p-orbitals on multiply bonded carbon atoms such as those found in alkenes, alkynes, neutral or charged aromatic rings, and neutral or charged heteroaromatic ring systems. Additionally, the orbitals can be p-orbitals on multiply bonded atoms such as boron or nitrogen or organometallic orbitals. The atoms of the bridge that contain the orbitals through which the electrons are delocalized are referred to here as the "critical atoms." The number of critical atoms in a bridge can be a number from 1 to about 30. The critical atoms can also be substituted with, for example, alkyl, aryl, or other groups. One or more atoms, with the exception of hydrogen, on alkyl or aryl substituents of critical atoms in the bridge may be bonded to atoms in other alkyl or aryl substituents to form one or more rings.

Representative chromophores, donors, acceptors, and π-bridges useful in electro-optic devices of the invention include those described in U.S. Pat. Nos. 6,361,717; 6,348,992; 6,090,332; 6,067,186; 5,708,178; and 5,290,630; each expressly incorporated herein by reference in its entirety. Other representative chromophores are described in WO 02/08215; U.S. patent application Ser. No. 10/212,473, filed Aug. 2, 2002; U.S. patent application Ser. No. 10/347,117, filed Jan. 15, 2003; and U.S. Provisional Patent Application No. 60/520,802, filed Nov. 17, 2003; Adv. Mater. 14(23): 1763-1768, 2002; and Adv. Mater. 14(19):1339-1365, 2002; each expressly incorporated herein by reference in its entirety.

The materials and methods described herein can be useful in a variety of electro-optic devices and methods. In addition, these materials and methods may be applied to polymer transistors or other active or passive electronic devices, as well as OLED (organic light emitting diode) or LCD (liquid crystal display) applications.

The use of organic polymers in integrated optics and optical communication systems containing optical fibers and routers has been previously described. The compounds, molecular components, polymers, and compositions (hereinafter, "materials") may be used in place of currently used materials in most types of integrated optics devices, optical computing applications, and optical communication systems. For instance, the materials may be used in switches, modulators, waveguides, or other electro-optical devices.

For example, in optical communication systems devices fabricated to include the materials described herein may be incorporated into routers for optical communication systems or waveguides for optical communication systems or for optical switching or computing applications.

Techniques to prepare components of optical communication systems from optically transmissive materials have been previously described, and may be utilized to prepare such components from materials provided by the present invention. Many articles and patents describe suitable techniques, and reference other articles and patents that describe suitable techniques, where the following articles and patents are exemplary:

Eldada, L. and L. Shacklette, "Advances in Polymer Integrated Optics," *IEEE Journal of Selected Topics in Quantum Electronics* 6(1):54-68, January/February 2000; Wooten, E. L., et al. "A Review of Lithium Niobate Modulators for Fiber-Optic Communication Systems," *IEEE Journal of Selected Topics in Quantum Electronics* 6(1):69-82, January/February 2000; Heismann, F., et al. "Lithium Niobate Integrated Optics Selected Contemporary Devices and System Applications," *Optical Fiber Telecommunications III B*, Academic, Kaminow and Koch (eds.), New York, 1997, pp. 377-462; Murphy, E., "Photonic Switching," *Optical Fiber Telecommunications III B*, Academic, Kaminow and Koch (eds.), New York, 1997, pp. 463-501; E. Murphy, *Integrated Optical Circuits and Components: Design and Applications.*, Marcel Dekker, New York, August 1999; Dalton, L., et al., "Polymeric Electro-Optic Modulators: From Chromophore Design to Integration with Semiconductor Very Large Scale Integration Electronics and Silica Fiber Optics," *Ind. Eng. Chem. Res.* 38:8-33, 1999; Dalton, L., et al., "From Molecules to Opto-Chips: Organic Electro-Optic Materials," *J. Mater. Chem.* 9:1905-1920, 1999; Liakatas, I. et al., "Importance of Intermolecular Interactions in the Nonlinear Optical Properties of Poled Polymers," *Applied Physics Letters* 76(11): 1368-1370, Mar. 13, 2000; Cai. C., et al., "Donor-Acceptor-Substituted Phenylethenyl Bithiophenes: Highly Efficient and Stable Nonlinear Optical Chromophores," *Organic Letters* 1(11):1847-1849, 1999; Razna, J., et al., "NLO Properties of Polymeric Langmuir-Blodgett Films of Sulfonamide-Substituted Azobenzenes," *J. of Materials Chemistry* 9:1693-1698, 1999; Van den Broeck, K., et al., "Synthesis and Nonlinear Optical Properties of High Glass Transition Polyimides," *Macromol. Chem. Phys* 200:2629-2635, 1999; Jiang, H., and A. K. Kakkar, "Functionalized Siloxane-Linked Polymers for Second-Order Nonlinear Optics," *Macromolecules* 31:2508, 1998; Jen, A. K.-Y., "High-Performance Polyquinolines with Pendent High-Temperature Chromophores for Second-Order Nonlinear Optics," *Chem. Mater.* 10:471-473, 1998; "Nonlinear Optics of Organic Molecules and Polymers," Hari Singh Nalwa and Seizo Miyata (eds.), CRC Press, 1997; Cheng Zhang, Ph.D. Dissertation, University of Southern California, 1999; Galina Todorova, Ph.D. Dissertation, University of Southern California, 2000; U.S. Pat. Nos. 5,272,218; 5,276,745; 5,286,872; 5,288,816; 5,290,485; 5,290,630; 5,290,824; 5,291,574; 5,298,588; 5,310,918; 5,312,565; 5,322,986; 5,326,661; 5,334,333; 5,338,481; 5,352,566; 5,354,511; 5,359,072; 5,360,582; 5,371,173; 5,371,817; 5,374,734; 5,381,507; 5,383,050; 5,384,378; 5,384,883; 5,387,629; 5,395,556; 5,397,508; 5,397,642; 5,399,664; 5,403,936; 5,405,926; 5,406,406; 5,408,009; 5,410,630; 5,414,791; 5,418,871; 5,420,172; 5,443,895; 5,434,699; 5,442,089; 5,443,758; 5,445,854; 5,447,662; 5,460,907; 5,465,310; 5,466,397; 5,467,421; 5,483,005; 5,484,550; 5,484,821; 5,500,156; 5,501,821; 5,507,974; 5,514,799; 5,514,807; 5,517,350; 5,520,968; 5,521,277; 5,526,450; 5,532,320; 5,534,201; 5,534,613; 5,535,048; 5,536,866; 5,547,705; 5,547,763; 5,557,699; 5,561,733; 5,578,251; 5,588,083; 5,594,075; 5,604,038; 5,604,292; 5,605,726; 5,612,387; 5,622,654; 5,633,337; 5,637,717; 5,649,045; 5,663,308; 5,670,090; 5,670,091; 5,670,603; 5,676,884; 5,679,763; 5,688,906; 5,693,744; 5,707,544; 5,714,304; 5,718,845; 5,726,317; 5,729,641; 5,736,592; 5,738,806; 5,741,442; 5,745,613; 5,746,949; 5,759,447; 5,764,820; 5,770,121; 5,76,374; 5,776,375; 5,777,089;

5,783,306; 5,783,649; 5,800,733; 5,804,101; 5,807,974; 5,811,507; 5,830,988; 5,831,259; 5,834,100; 5,834,575; 5,837,783; 5,844,052; 5,847,032; 5,851,424; 5,851,427; 5,856,384; 5,861,976; 5,862,276; 5,872,882; 5,881,083; 5,882,785; 5,883,259; 5,889,131; 5,892,857; 5,901,259; 5,903,330; 5,908,916; 5,930,017; 5,930,412; 5,935,491; 5,937,115; 5,937,341; 5,940,417; 5,943,154; 5,943,464; 5,948,322; 5,948,915; 5,949,943; 5,953,469; 5,959,159; 5,959,756; 5,962,658; 5,963,683; 5,966,233; 5,970,185; 5,970,186; 5,982,958; 5,982,961; 5,985,084; 5,987,202; 5,993,700; 6,001,958; 6,005,058; 6,005,707; 6,013,748; 6,017,470; 6,020,457; 6,022,671; 6,025,453; 6,026,205; 6,033,773; 6,033,774; 6,037,105; 6,041,157; 6,045,888; 6,047,095; 6,048,928; 6,051,722; 6,061,481; 6,061,487; 6,067,186; 6,072,926; 6,081,632; 6,081,634; 6,081,794; 6,086,794; 6,090,322; and 6,091,879.

The foregoing references provide instruction and guidance to fabricate waveguides from materials generally of the types described herein using approaches such as direct photolithography, reactive ion etching, excimer laser ablation, molding, conventional mask photolithography, ablative laser writing, or embossing (e.g., soft embossing). The foregoing references also disclose polarizable chromophore compounds that may be incorporated into the electro-optic devices.

Components of optical communication systems that may be fabricated, in whole or part, with materials according to the present invention include, without limitation, straight waveguides, bends, single-mode splitters, couplers (including directional couplers, MMI couplers, star couplers), routers, filters (including wavelength filters), switches, modulators (optical and electro-optical, e.g., birefringent modulator, the Mach-Zender interferometer, and directional and evanescent coupler), arrays (including long, high-density waveguide arrays), optical interconnects, optochips, single-mode DWDM components, and gratings. The materials described herein may be used with, for example, wafer-level processing, as applied in, for example, vertical cavity surface emitting laser (VCSEL) and CMOS technologies.

The materials described herein may be used in telecommunication, data communication, signal processing, information processing, and radar system devices and thus may be used in communication methods relying, at least in part, on the optical transmission of information. Thus, a method according to the present invention may include communicating by transmitting information with light, where the light is transmitted at least in part through a core layer cladded by a polymeric material of the invention.

The materials of the present invention can be incorporated into various electro-optical devices. Accordingly, in another aspect, the invention provides electro-optic devices including the following:

a waveguide comprising a cladding material according to the present invention;

an optical switch comprising a cladding material according to the present invention;

an optical modulator comprising a cladding material according to the present invention;

an optical coupler comprising a cladding material according to the present invention;

an optical router comprising a cladding material according to the present invention;

a communications system comprising a cladding material according to the present invention;

a method of data transmission comprising transmitting light through or via a core layer cladded with a cladding material according to the present invention;

a method of telecommunication comprising transmitting light through or via a core material cladded with a cladding material according to the present invention;

a method of transmitting light comprising directing light through or via a core layer cladded with a cladding material according to the present invention;

a method of routing light through an optical system comprising transmitting light through or via a core layer cladded with a cladding material according to the present invention;

an interferometric optical modulator or switch, comprising: (1) an input waveguide; (2) an output waveguide; (3) a first leg having a first end and a second end, the first leg being coupled to the input waveguide at the first end and to the output waveguide at the second end; and 4) and a second leg having a first end and a second end, the second leg being coupled to the input waveguide at the first end and to the output waveguide at the second end, wherein at least one of the first and second legs includes a core layer cladded with a cladding material according to the present invention;

an optical modulator or switch, comprising: (1) an input; (2) an output; (3) a first waveguide extending between the input and output; and (4) a second waveguide aligned to the first waveguide and positioned for evanescent coupling to the first waveguide; wherein at least one of the first and second legs includes a core layer cladded with a cladding material according to the present invention, the modulator or switch may further including an electrode positioned to produce an electric field across the first or second waveguide; and an optical router comprising a plurality of switches, wherein each switch includes: (1) an input; (2) an output; (3) a first waveguide extending between the input and output; and (4) a second waveguide aligned to the first waveguide and positioned for evanescent coupling to the first waveguide; wherein at least one of the first and second legs includes a core layer cladded with a cladding material according to the present invention, the plurality of switches may optionally be arranged in an array of rows and columns.

The following examples are provided for the purpose of illustrating, not limiting, the invention.

EXAMPLES

Example 1

General Procedures

All chemical reagents were purchased from Aldrich and were used as received unless otherwise specified. All reactions were carried out under inert nitrogen atmosphere unless otherwise specified. $^1$H NMR spectra (200 MHz) were taken on a Bruker-200 FT NMR spectrometer, all spectra were obtained in $CDCl_3$ at 18° C. (unless otherwise noted).

Example 2

The Preparation of a Representative Thermally Reversible Crosslinkable Polymer: CLAD2

In this example, the preparation of a representative thermally reversible crosslinkable polymer of the invention, CLAD2, is described. The preparation of CLAD2 is illustrated schematically in FIG. 3.

N-carboxyethylmaleimide (1). To a solution of maleic anhydride (33.6 g, 377 mmol) and β-alanine (36.96 g, 377 mmol) in 400 mL of acetic acid was added 52 mL toluene, the mixture was an opaque suspension. Heating to 140° C. provided a clear solution, which was refluxed for 5 hours. To the solution was added 50 mL toluene and reflux was continued. In the next 4 hours 31 mL acetic acid/water mixture was separated by distillation using a Dean-Stark apparatus. The reaction mixture was cooled to 90° C. and solvent was removed via distillation with water aspiration. The residue viscous oil was taken up in 200 mL acetone and concentrated. The crude product was purified through a flash chromatography on silica gel with a gradient eluent of 5-12% methanol in dichloromethane to afford 35 g of 1 as white solid. $^1$H NMR (CDCl$_3$) δ 6.70 (s, 2H), 3.81 (t, 7.2 Hz, 2H), 2.68 (t, 7.2 Hz, 2H), 2.14 (s, 1H).

Furan adduct of N-carboxyethylmaleimide (2). To N-carboxyethylmaleimide 1 (1.01 g, 6 mmol) and furan (4.08 g, 60 mmol) in a 100 mL flask was added 19 mL benzene at room temperature. The resulting mixture was heated to 75° C. and then refluxed for 12 hours. The mixture was cool to room temperature and concentrated via rotary evaporator to afford a white solid 1.4 g (99%), which was used without further purification. $^1$H NMR (CDCl$_3$) δ 6.49 (s, 2H), 5.07 (s, 2H), 3.50 (t, 7.2 Hz, 2H), 2.87 (s, 2H), 2.37 (t, 7.4 Hz, 2H).

The preparation of 1 and 2 is illustrated in FIG. 1.

CLAD2. To a solution of poly(4-vinylphenol-co-methyl methacrylate) (51 mole percent 4-vinylphenol) (0.5 g, 2.31 mmol 4-vinylphenol), DPTS (15 mg, 0.051 mmol), and acid 2 (60.3 mg, 0.254 mmol) in 15 mL THF was slowly added 4 mL dichloromethane. The resulting solution was stirred for 15 minutes. DCC (62.9 mg, 0.305 mmol) was added in one portion and the resulting mixture was stirred at room temperature for 12 hours. Then DPTS (15 mg, 0.051 mmol) and 3-(2-furyl)propanoic acid 3 (36 mg, 0.254 mmol) was added into reaction mixture and stirred for 15 minutes before DCC (62.9 mg, 0.305 mmol) was added in one portion, the resulting mixture was stirred for another 12 hours. Finally, DPTS (136 mg, 0.462 mmol), pentafluorobenzoic acid (490 mg, 2.31 mmol), and additional 5 mL THF were added to reaction mixture and stirred for 15 minutes before DCC (572 mg, 2.772 mmol) was added in one portion. The resulting mixture was stirred for 12 hours and filtered through 0.2 mm disc. Solvent was removed via rotary evaporator and the remaining viscous oil was dissolved in 5 mL THF. The floating white solid was filtered through 0.2 mm disc again. This process was repeated in THF for three times in total and once in dichloromethane. The residue was dissolved in 5 mL THF and concentrated to 2 mL, which was then precipitated in 200 mL methanol. The polymer product was collected by filtration, redissolved in 5 mL THF, and the purification repeated four time in total to obtain 750 mg of CLAD2 as white solid (80%).

Example 3

The Preparation of a Representative Thermally Reversible Crosslinkable Polymer: CLAD3

In this example, the preparation of a representative thermally reversible crosslinkable polymer of the invention, CLAD3, is described. The preparation of CLAD3 is illustrated schematically in FIG. 3.

CLAD3 was prepared in manner similar to that described for CLAD2 in Example 2. Poly(4-vinylphenol-co-methyl methacrylate) (0.5 g) was coupled with acid 2 (121 mg, 0.508 mmol), 3-(2-furyl)propanoic acid 3 (71.2 mg, 0.508 mmol), and pentafluorobenzoic acid (367.4 mg, 1.73 mmol) to afford 500 mg of CLAD3 as white polymer.

Example 4

The Preparation of a Representative Thermally Reversible Crosslinkable Polymer: CLAD4-1

In this example, the preparation of a representative thermally reversible crosslinkable polymer of the invention, CLAD4-1, is described. The preparation of CLAD4-1 is illustrated schematically in FIG. 5.

CLAD4-1 was prepared in manner similar to that described for CLAD2 in Example 2. Poly(4-vinylphenol-co-methyl methacrylate) (2.0 g) was coupled with acid 2 (1.1 g, 4.637 mmol) and acid 4 (1.14 g, 4.637 mmol) to afford 1.89 g of CLAD4-1 as white polymer.

Example 5

The Preparation of a Representative Thermally Reversible Crosslinkable Polymer: CLAD4-2

In this example, the preparation of a representative thermally reversible crosslinkable polymer of the invention, CLAD4-2, is described. The preparation of CLAD4-2 is illustrated schematically in FIG. 5.

CLAD4-2 was prepared in manner similar to that described for CLAD2 in Example 2. Poly(4-vinylphenol-co-methyl methacrylate) (2.0 g) was coupled with acid 2 (1.205 g, 5.08 mmol) and 3-(2-furyl)propanoic acid 3 (712 mg, 5.08 mmol) to afford 2.5 g of CLAD4-2 as white polymer.

Example 6

The Preparation of a Thermally Crosslinkable Polymer: CLAD4-3

In this example, the preparation of a thermally crosslinkable polymer, CLAD4-3, is described. The preparation of CLAD4-3 is illustrated schematically in FIG. 5.

CLAD4-1 was prepared in manner similar to that described for CLAD2 in Example 2. Poly(4-vinylphenol-co-methyl methacrylate) (2.0 g) was coupled with acid 2 (1.205 g, 5.08 mmol) and acid 5 (864 mg, 0.508 mmol) to afford 2.8 g of CLAD4-3 as white polymer.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A waveguide cladding, comprising a thermally reversibly crosslinked polymer adjacent to a waveguide having a refractive index greater than the thermally reversibly crosslinked polymer.

2. The cladding of claim 1, wherein the crosslinked polymer comprises one or more 4+2 cycloaddition moieties, the 4+2 cycloaddition moieties being reactive to form diene and dienophile moieties.

3. The cladding of claim 1, wherein the crosslinked polymer reverts to its precursor crosslinkable polymer above the crosslinked polymer's glass transition temperature.

4. The cladding of claim 3, wherein the conductivity of the crosslinkable polymer is greater than the conductivity of the crosslinked polymer.

5. A cladded waveguide, comprising:
(a) a waveguide; and
(b) a cladding, comprising a thermally reversibly crosslinked polymer, wherein the cladding is adapted to provide internal reflectance of light transmitted through the waveguide.

6. The waveguide of claim 5, wherein the cladding has a conductivity greater than the conductivity of the waveguide at the waveguide's glass transition temperature.

7. The waveguide of claim 5, wherein the waveguide is a passive waveguide.

8. The waveguide of claim 5, wherein the waveguide is an active waveguide.

9. The waveguide of claim 5, wherein the waveguide comprises a nonlinear optically active material.

10. An electro-optic device, comprising a cladded waveguide comprising:
(a) a waveguide;
(b) a cladding adjacent to the waveguide, comprising a thermally reversibly crosslinked polymer; and
(c) one or more electrodes.

11. The device of claim 10, wherein the cladding has a conductivity greater than the conductivity of the waveguide at the waveguide's glass transition temperature.

12. The device of claim 10, wherein the waveguide comprises a nonlinear optically active material.

13. An electro-optic device, comprising:
(a) a first electrode;
(b) a second electrode;
(c) a waveguide intermediate the first and second electrodes, wherein the waveguide comprises an alignable nonlinear optically active material;
(d) a first cladding intermediate the waveguide and the first electrode, wherein the first cladding comprises a thermally reversibly crosslinked polymer; and
(e) a second cladding intermediate the waveguide and the second electrode, wherein the second cladding comprises a thermally reversibly crosslinked polymer.

14. The device of claim 13, wherein the first and second claddings each have a conductivity greater than the conductivity of the waveguide at the waveguide's glass transition temperature.

15. A method for aligning a nonlinear optically active material in a waveguide by electric field poling, comprising:
(a) heating a cladded waveguide to the waveguide's glass transition temperature, the cladded waveguide comprising:
(i) a waveguide comprising an alignable nonlinear optically active material; and
(ii) a cladding comprising a thermally reversibly crosslinked polymer;
(b) applying an electric field to the cladded waveguide thereby aligning at least a portion of the alignable nonlinear optically active material; and
(c) cooling the cladded waveguide to provide a waveguide having aligned nonlinear optically active material.

16. The method of claim 15, wherein the cladding has a conductivity greater than the conductivity of the waveguide at the waveguide's glass transition temperature.

17. A thermally reversibly crosslinkable polymer, consisting essentially of:
(a) one or more diene moieties; and
(b) one or more dienophile or dienophile precursor moieties;
wherein the diene and dienophile moieties are pendant from a polymer backbone and are reactive to form 4+2 cycloaddition moieties to provide a crosslinked polymer, wherein the 4+2 cycloaddition moieties revert to their corresponding diene and dienophile moieties on heating the crosslinked polymer above its glass transition temperature.

18. The polymer of claim 17, wherein the dienophile moieties comprise maleimide moieties or substituted maleimide.

19. The polymer of claim 17, wherein the diene moieties comprise furan moieties or substituted furan moieties.

20. A thermally reversibly crosslinked polymer, consisting essentially of one or more 4+2 cycloaddition moieties; wherein the 4+2 cycloaddition moieties are reversibly, thermally reactive to provide a polymer consisting essentially of diene moieties and dienophile moieties pendant from a polymer backbone.

21. The polymer of claim 20, wherein the dienophile moieties comprise maleimide moieties or substituted maleimide.

22. The polymer of claim 20, wherein the diene moieties comprise furan moieties or substituted furan moieties.

* * * * *